United States Patent Office 3,527,962
Patented Sept. 8, 1970

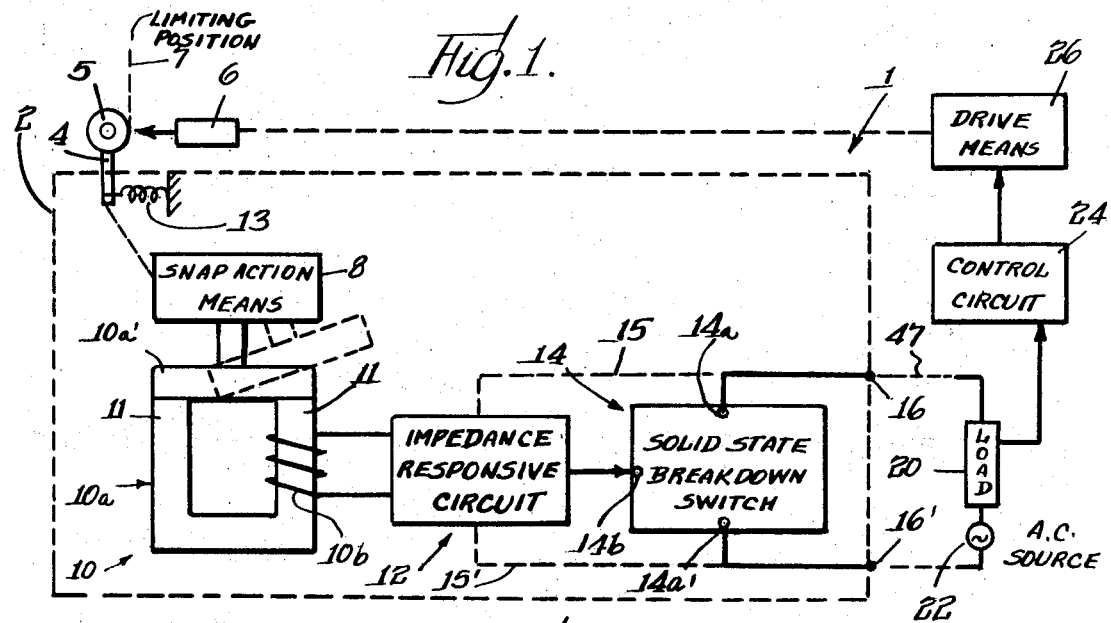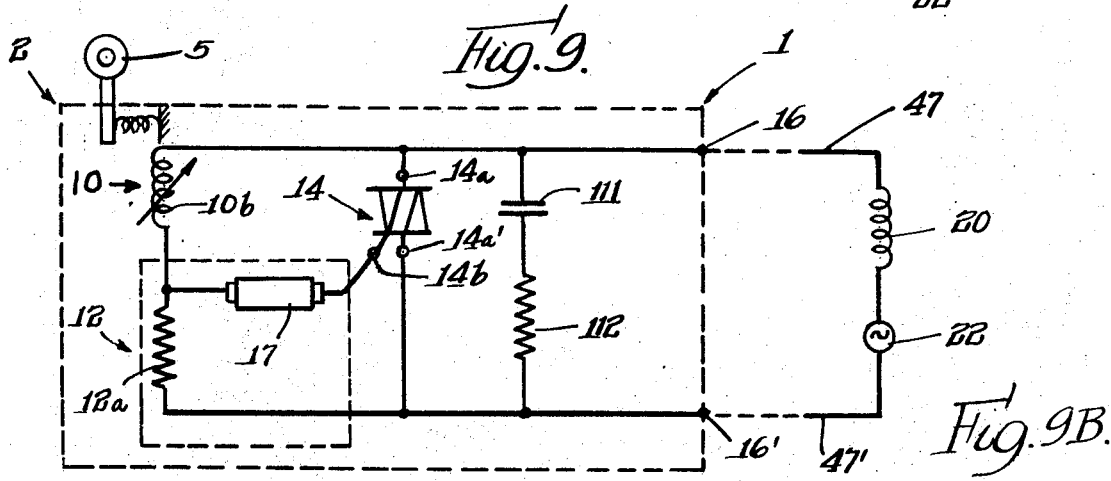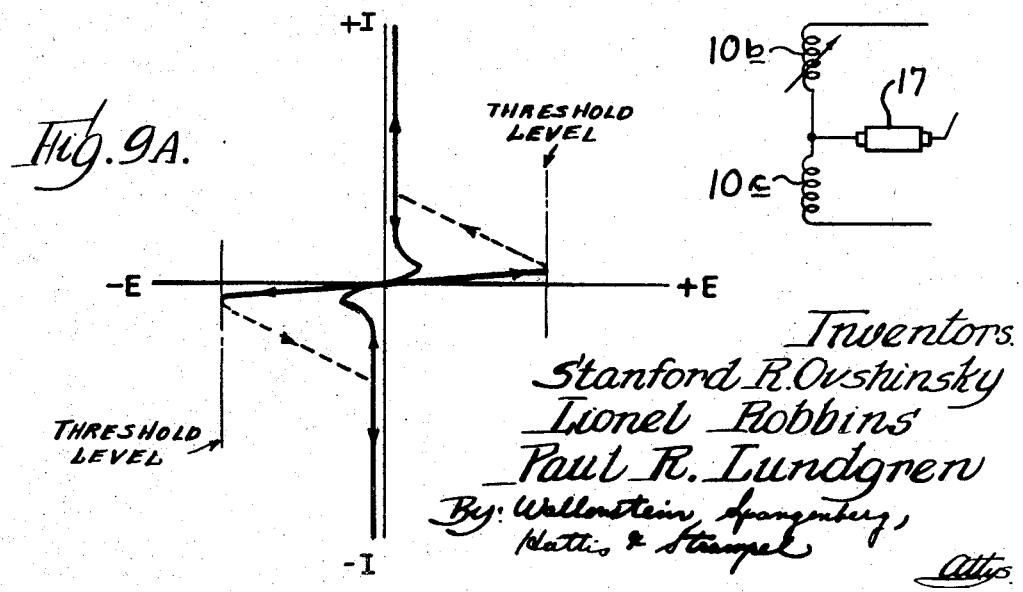

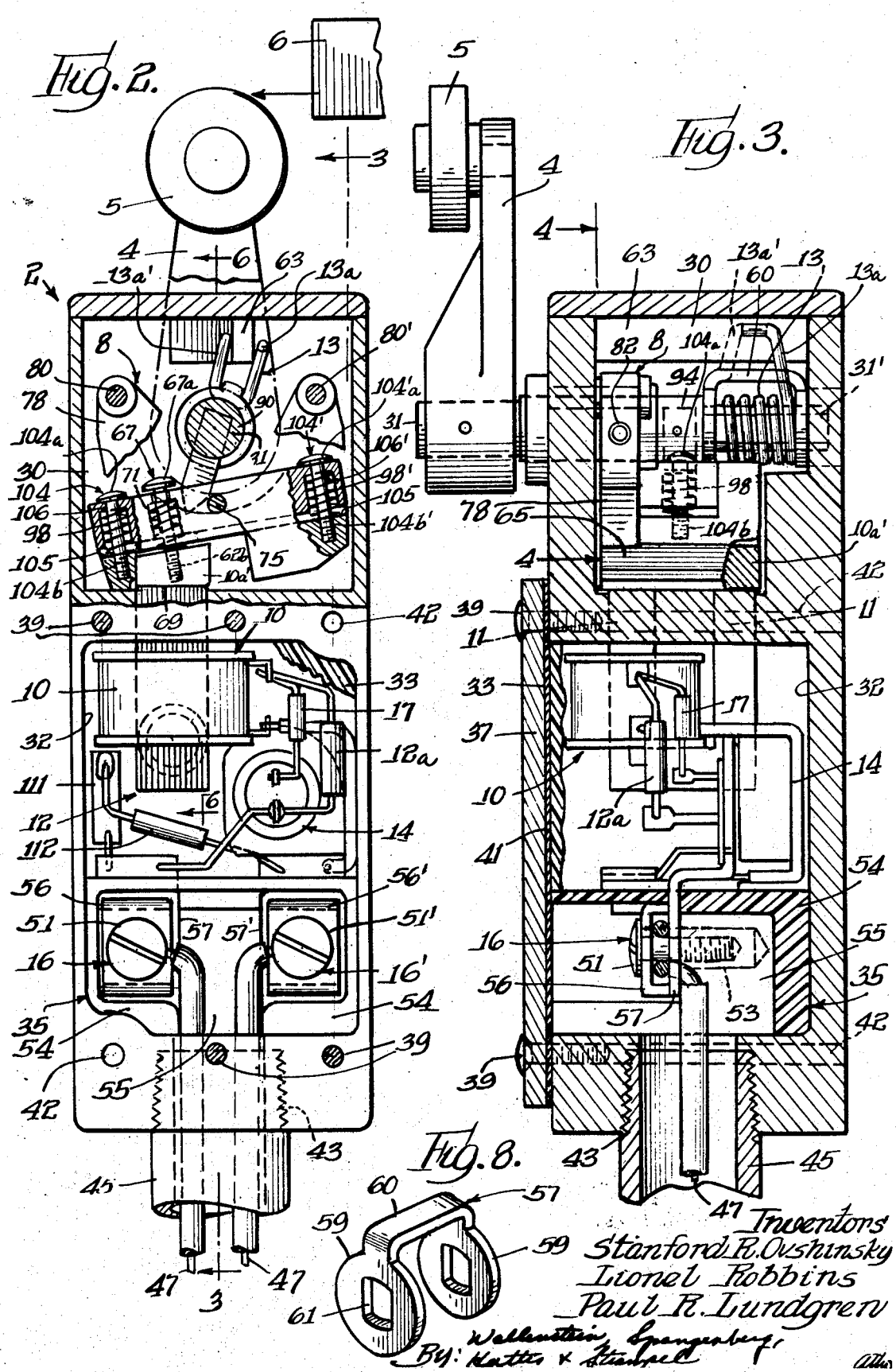

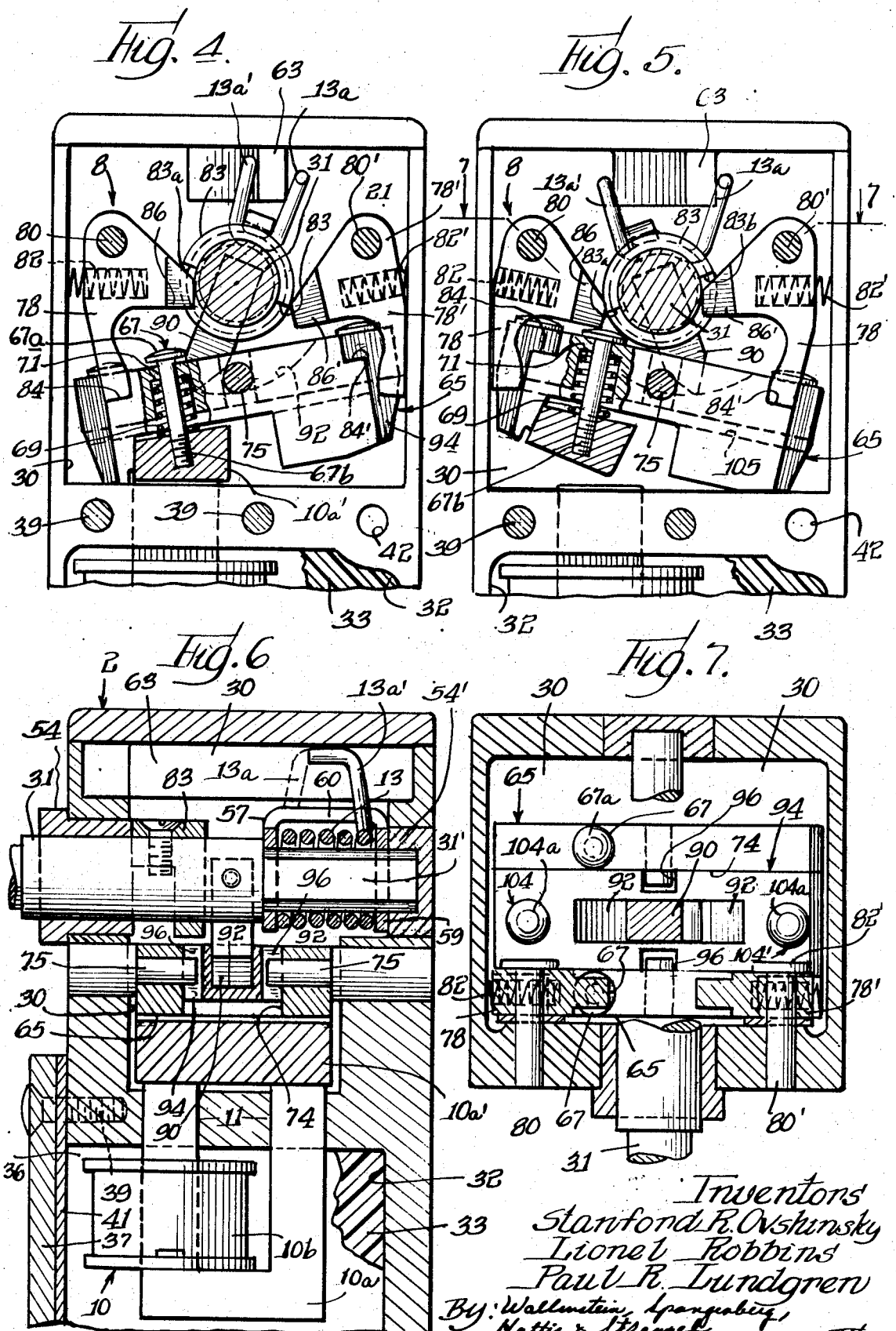

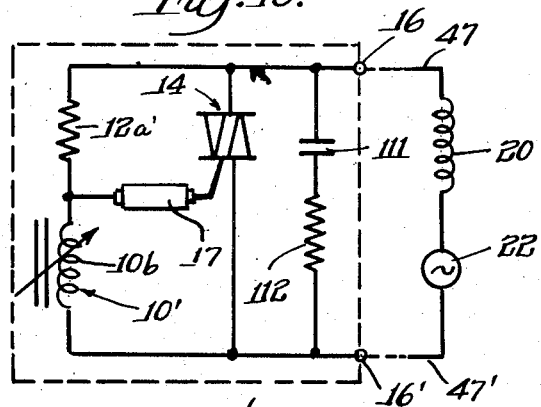
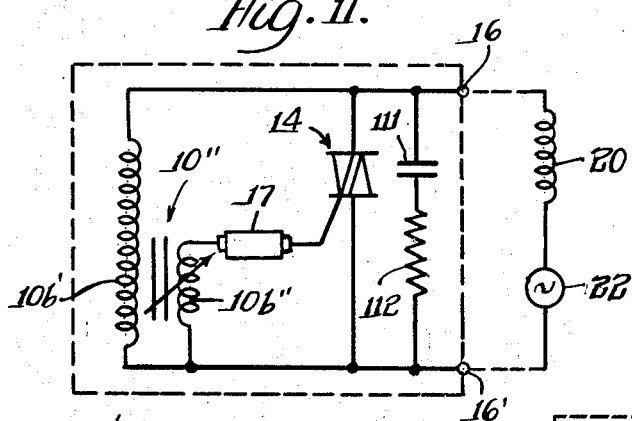
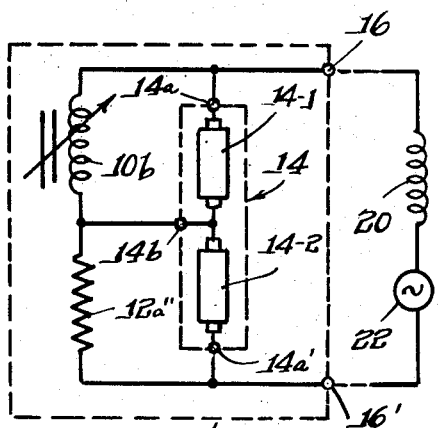
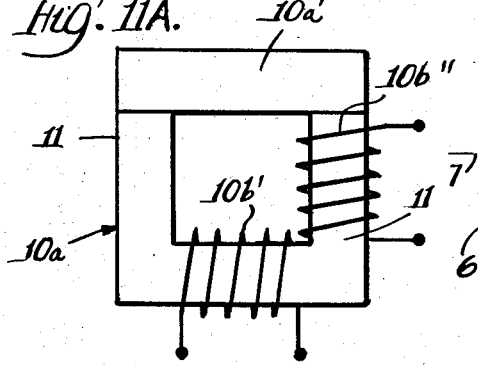
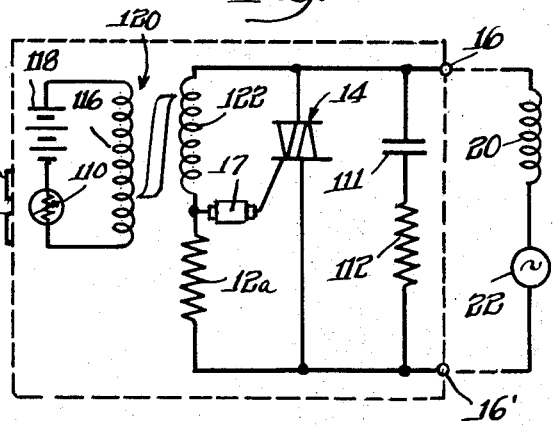
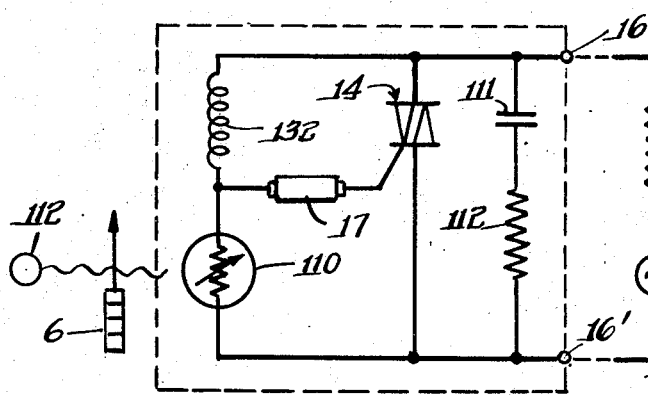

3,527,962
MACHINE TOOL LIMIT SWITCH
Stanford R. Ovshinsky, Bloomfield Hills, Lionel Robbins, Orchard Lake, and Paul R. Lundgren, Rochester, Mich., assignors to Energy Conversion Devices, Inc., Troy, Mich., a corporation of Delaware
Filed June 7, 1966, Ser. No. 555,894
Int. Cl. H03k 17/56
U.S. Cl. 307—252                                    12 Claims

ABSTRACT OF THE DISCLOSURE

A contact-free limit switch unit including most advantageously variable inductor means which has a core having separable core sections and a winding on the core. An actuator member is provided which is engaged and moved by a movable element of a machine tool or the like. Snap-action means is operated by the actuator member, the snap-action means when engaged by the movable element moving one of the core sections between core path closing and core path opening positions. A high current capacity solid state threshold-type switch is coupled across a pair of output terminals. Control means are coupled to the winding for feeding a control voltage to the solid state switch which voltage exceeds the threshold level of the solid state switch when said one core section is in the position resulting from the movement of said snap-action means by the actuator member.

---

This invention relates to a limit switch unit having particular utility in industrial machine tools using cooling liquids and which closes or opens a circuit when a movable element monitored by the limit switch unit reaches a given limiting position. (By machine tools is meant machine driven equipment for cutting, polishing, shaping or otherwise working metal or the like.)

The limit switches in current use on industrial machine tools commonly have a housing containing a mechanical linkage which responds to the movement of a movable machine tool element being monitored against an actuating member extending from the housing by closing or opening contacts controlling a circuit external to the housing. Operation of the contacts will generally either stop the movable element or reverse the movement thereof. Frequently, these limit switches are used in explosive atmospheres where great difficulty and expense have been encountered in isolating the contacts, which generally arc on the opening thereof, from such atmospheres to prevent explosions. Arcing of the contacts also speeds contact wear which requires periodic replacement of the contacts.

The most serious problem in limit switches heretofore developed for machine tool applications is that the cooling fluids used therein frequently spill or splatter on the limit switches, which are usually located in the vicinity of the tool heads thereof, and gain access to the contacts of the limit switches through small clearance openings in the limit switch housings which prevents proper operation of the switches and cause rapid deterioration thereof. (The cooling fluids can be water, a mixture of soap and water, lubricating oil or other liquids used for cooling or both cooling and lubricating and/or metal cutting or polishing purposes.)

One of the main objects of the invention is to provide a limit switch unit which can be used in the vicinity of the tool heads of machine tools using cooling liquids which can spill on the switch unit without having any adverse effect thereon.

Another object of the invention is to provide an improved limit switch unit which eliminates the aforesaid problems resulting from arcing contacts, more particularly, to provide an improved limit switch unit which does not require periodic replacement of worn out contacts or other components thereof and can be used without danger in explosive atmospheres. Still another related object of the invention is to provide a high current capacity limit switch unit as described and has an exceedingly long life.

A further object of the invention is to provide a limit switch unit as described which can replace existing limit switch units without requiring any additional wiring or modification of or attachments to the movable element being monitored.

A still further object of the invention is to provide a limit switch unit as described which is both reliable and economical to manufacture.

In accordance with a preferred form of the invention, the machine tool limit switch unit includes a housing with a pair of output terminals to be connected into an external circuit including a load device such as a relay for controlling the movement of the tool head of the machine tool, and a voltage source for energizing the relay when the limit switch unit is in a circuit closing condition. The limit switch housing includes a variable electrical means energized by the aforesaid voltage source so no additional wiring therefor is necessary. The variable electrical means most advantageously includes a variable inductor, whose electrical characteristic (i.e. the inductive reactance in the case of the inductor) is responsive to the position of the movable element being monitored, namely the tool head or a part movable therewith. The variable electrical means is preferably controlled by an actuator and a snap action mechanism, the actuator being engaged by the movable element when it reaches a limiting position to operate the snap action mechanism. Where an inductor is used, the inductor preferably has a winding wound on a core which has a movable core section which is movable between a position where the core has a continuous magnetic path and a position where the magnetic path of the core is interrupted. The triggering of the snap action mechanism moves the movable core section between the aforesaid positions. The variable electrical means controls solid state components including most advantageously a high current capacity breakdown switch embedded in a solid isolating medium, like an epoxy material. The epoxy embedded solid state components are thus permanently isolated from moisture, cooling fluids and the like that could possibly gain entry into the switch housings. The breakdown switch opens and closes the load circuit and is energized by the aforesaid voltage source which energizes the load device.

The variable electrical means is preferably arranged in a circuit which provides a voltage of a first given value when the electrical characteristic of the variable electrical means has a first normal value indicating that the movable element has not reached the limiting position and of another substantially different value when the electrical characteristic of the variable electrical means has a value indicating that the movable element has reached the limiting position. In the case where the variable electrical means is a variable impedance, such as the variable inductor, it most advantageously forms part of a voltage divider circuit which includes another impedance in series with the variable impedance. The voltage divider circuit is most advantageously connected across the output terminals of the limit switch unit and a three terminal solid state bidirectional breakdown switch to be controlled by the voltage divider circuit. The bidirectional breakdown switch acts in a manner analogous to a pair of back-to-back connected Thyratron devices in that it conducts heavily in either direction when fired by a voltage in excess of a given threshold level applied to a control terminal thereof. Normally, the solid state breakdown switch may be in a relatively non-conductive state so that the circuit to which the output terminals of the limit switch unit are connected is in an open-circuited state. The aforesaid voltage divider circuit connected across the terminals of the limit switch is preferably a high impedance circuit to minimize current drain. The control terminal of the breakdown switch is connected either directly to the juncture of the two aforesaid impedance elements of the voltage divider circuit or indirectly through a two terminal bidirectional breakdown device analogous to a pair of back-to-back connected PNPN diodes.

The solid state breakdown switch is fired into a relatively highly conductive circuit closing state when the control voltage applied to the control terminal exceeds a given threshold level and the voltage applied to the load terminals thereof is of a given magnitude. The voltage divider circuit may be designed so that a control voltage exceeding said threshold level is applied to the solid state breakdown switch when the voltage division in the divider circuit is modified by the actuation of the limit switch by the aforesaid movable element.

The solid state breakdown switch is particularly advantageous relative, for example, to transistors and other solid state devices, because it is a high current capacity quick triggering device usable at commercial power line voltages and is thus analogous to the contacts now in use in most limit switches, but without the aforesaid disadvantages caused by the sparking and wearing of the contacts.

Also in the preferred form of the invention, where the limit switch unit is actuated by physical contact of the movable element being monitored with the actuator referred to, the limit switch unit can replace conventional types of limit switches with little or no modification of or attachments to the movable element being monitored. Since the preferred limit switch unit uses a bidirectional breakdown switch, the limit switch unit can be reliably used with alternating current.

The above and other objects, advantages and features of the invention will become apparent upon making reference to the specification to follow, the claims and the drawings wherein:

FIG. 1 is a simplified diagram of one basic form of the present invention;

FIG. 2 is a front view, broken away, of a specific and preferred form of the invention;

FIG. 3 is a sectional view of FIG. 2, taken substantially along the line 3—3 therein;

FIG. 4 is an enlarged fragmentary sectional view, taken along section line 4—4 of FIG. 3, showing an exemplary normal or inoperative position of the limit switch unit;

FIG. 5 is a view corresponding to FIG. 4 showing the limit switch unit in an exemplary tripped or operative position;

FIG. 6 is an enlarged fragmentary sectional view, taken substantially along the line 6—6 of FIG. 2;

FIG. 7 is a sectional view through FIG. 5, taken along section line 7—7 thereof;

FIG. 8 is a perspective view of a spring tensioning element forming part of the assembly best shown in FIG. 6;

FIG. 9 is an electrical circuit diagram illustrating the preferred circuitry of the electrical portion of the limit switch unit shown in FIGS. 1 through 7;

FIG. 9A shows the E–I curves of a two terminal breakdown or threshold device forming an element of the circuit of FIG. 9;

FIG. 9B shows a modification of the circuit shown in FIG. 9;

FIG. 10 shows a further and more substantial modification of FIG. 9;

FIG. 11 shows another limit switch circuit constituting another form of the invention where the variable electrical means of the limit switch is a transformer;

FIG. 11A illustrates the construction of the transformer of the circuit shown in FIG. 11;

FIG. 12 illustrates another limit switch circuit constituting still another form of the invention;

FIG. 13 illustrates a form of limit switch unit and circuit therefor which represents a modification of both the mechanical and electrical portions of the limit switch arrangement shown in FIGS. 1 through 12, the FIG. 13 arrangement utilizing a photocell as the position sensing element of the limit switch unit; and FIG. 14 illustrates another photocell limit switch unit constituting another form of the invention.

GENERAL DESCRIPTION (FIG. 1)

Referring now to FIG. 1, the limit switch unit there there illustrated includes a housing 2 identified by dashed lines from an actuator arm 4 carrying a roller 5 adapted to be engaged by a movable element 6 when the element reaches a limiting position 7. (It is apparent that the arrangement illustrated could be reversed wherein the limit switch unit 1 could be carried by a movable element and the arm 4 acutated by a stationary limiting member represented by element 6.) The movable element 6 may be one which moves with the movable tool head of a machine tool where cooling fluid splatters on the housing 2. When the roller 5 is engaged by the movable element 6, a snap action means 8 within the housing 2 preferably comes into play suddenly to vary the electrical characteristic of a variable electrical means 10 which most advantageously is an inductor element.

As illustrated, the inductor element 10 has a core 10a around which is wound winding 10b forming an inductance whose electrical impedance is a function of the reluctance of the magnetic path formed by the core 10a. The core 10a has a movable section 10a' which normally bridges ap air of core legs 11—11, that is before the movable element 6 has reached the limiting position 7. When the snap action means 8 is tripped, the snap action means 8 will suddenly move the core section 10a' into a core path opening position shown in dashed lines where the legs 11—11 of the core are not bridged thereby, leaving an air gap in the core. Under these circumstances, the inductance of the winding 10b will be materially reduced relative to the inductance thereof when the core legs 11—11 are bridged by the core section 10a'.

The operation of the limit switch can be reversed from that described wherein the core section 10a' will normally be in a core opening position and is moved to a core leg bridging position when the snap action means 8 is actuated by the movement of the movable element 6 into the limiting position 7.

The limit switch actuating arm 4 is preferably spring biased as by a spring 13 so that the snap action means will be returned automatically to its normal inoperative position when the movable element 6 is backed off from the limiting position 7.

Although it is a specific and preferred form of the invention to utilize a variable inductor element as the variable electrical means 10, other variable electrical means may be utilized within the contemplation of the broad aspects of the present invention.

Where the variable electrical means is a variable impedance like the inductor element 10, an impedance responsive circuit 12 is provided which responds to the variation in the impedance of the inductor element. For example, the impedance responsive circuit 12 may include one or more electrical impedance elements, such as a resistor, which forms a voltage divider circuit with the winding 10b of the variable inductor element 10. Normally, the output voltage of the circuit 12 is at a first level. When the limit switch unit is actuated, the output of the circuit 12 will increase suddenly to a second control level to effect firing of a solid state breakdown switch 14, which is a high current capacity switch device which provides at output terminals 16–16' of the limit switch unit a relatively large circuit opening impedance in the inoperative condition of the limit switch unit, and a very low circuit impedance where output terminals 16–16' of the limit switch unit are effectively short-circuited in the operative condition of the limit switch unit.

The solid state breakdown switch device 14 is most advantageously a bilateral or bidirectional device. (Such a device may be the three terminal type Ovonic threshold devices manufactured by Energy Conversion Devices, Inc. of Troy, Mich., or the three terminal silicon bidirectional triode thyristor which can conduct current in either direction through the load terminals 14a–14a' thereof. These devices are sold by a number of companies, one such device is sold under the name Triac by the General Electric Company.) The use of a bidirectional breakdown switch 14 desirably enables the limit switch unit of this invention to be used in alternating current circuits. The device 14 is, in many respects, analogous to a pair of back-to-back connected SCR devices (silicon controlled rectifiers) or Thyratron tubes with a common gate lead. In the unfired state thereof, the breakdown switch device provides a very large impedance of many millions of ohms across the load terminals thereof and in the fired state thereof, obtained by feeding a control voltage between a control terminal 14b thereof and one of the load terminals which exceeds a given threshold level provides a very low resistance current path of a few ohms or less across the load terminals thereof which is maintained until the instantaneous value of the current flowing through the load terminals drops below a holding current load near zero, whereupon the breakdown switch device resumes its high impedance state until fired once again.

Where an alternating current voltage of sufficient magnitude is applied to the control and load terminals of the device 14, it will fire and return to a non-conductive state each half cycle when the current through the device falls below the holding current.

As will appear, the impedance responsive circuit 12 is most advantageously a voltage divider circuit comprising the inductor winding 10b connected in series with an impedance (such as resistor 12a in FIG. 9). The control terminal 14b is directly (or through a switch device 17 in FIG. 9) connected to the juncture of the winding 10b and the impedance, and the outer ends of the voltage divider circuit are preferably connected across the output terminals 16–16' of the limit switch unit as indicated by the dashed lines 15–15' in FIG. 1.

The output terminals 16–16' of the limit switch unit 1 are connected to a load generally indicated by reference numeral 20, the nature of which is determined by the particular control circuit with which the limit switch is to be used. It could be a relay coil or other control element. A source 22 of alternating current, such as 110 volt A.C. commercial power source, is connected in series with the relay which, when energized, carries out a control function such as the stopping or reversal of the direction of movement of the movable element 6. To this end, the relay may operate a control circuit 24 which controls drive means 26 operating the movable element 6. The use of a relay coil or other inductive load for the limit switch unit can create problems of firing of certain types of solid state breakdown switches, such as the aforesaid Triac devices, which are overcome or minimized by the use of a variable inductor element as the variable electrical means 10.

LIMIT SWITCH ACTUATING MECHANISM
(FIGS. 2 THROUGH 8)

Refer now to FIGS. 2 through 8 which illustrate a specific exemplary and preferred form of the present invention where the limit switch is actuated by engagement of the movable element 6 to be monitored with the limit switch actuating roller 5 or other actuating means. (The broad, but less preferred aspects of the invention include operation of the limit switch unit without any physical contact with the limit switch unit as in the form of the invention shown in FIGS. 13 and 14 to be described.)

The housing 2 has an inner compartment 30 (FIG. 2) having among other things, snap action means 8 and the return spring 13 all to be described in more detail later in the specification. The housing also has a lower compartment 32 containing the electrical portion of the limit switch unit including the inductor element 10, the components making up the impedance responsive circuit 12 and the solid state breakdown switch device 14. All of these components are most advantageously potted by embedding the same in block 33 of epoxy material which may be formed by pouring the liquid epoxy material into the compartment 32 with the housing lying on its back and hardening the same. The bottom portion of the compartment 32 has a terminal block assembly 35 therein to be described. The compartment 32 opens onto the front of the housing 2 through an opening 36 (FIG. 6) closed by a cover plate 37 held in place on the housing body by screws 39. The inner face of the cover plate 37 may be coated with a layer 41 of the rubber-like material so that the cover will be sealed against entry of coolant, lubricating and other fluids used in machine tools. Through holes 42—42 are provided in the housing 2 for receiving limit switch anchoring screws (not shown).

The bottom of the housing has a threaded conduit receiving socket 43 adapted to threadingly receive the end of a conduit 45 containing insulated conductors 47—47 extending into the compartment 32 where they are anchored to suitable terminals 16–16'. The terminals may comprise screws 51–51' threading into threaded terminal strips 57–57' and clearance cavities like 53 (FIG. 3) formed within a molded insulating block 54 shaped like the bottom of the housing compartment 32. The block has a central cavity 55 aligned with the socket 43 to provide clearance for the insulated conductors 47—47. The ends of the conductors 47—47 are clamped between washers 56—56' engaged by the heads of the screws 51—51' and terminal strips 57—57'.

The shaft 31 carrying the limit switch actuating arm 4 projects through an opening in one side of the housing 2 and the shaft is journaled in bushings 54-54'. The shaft 31 has a flattened end portion 31' over which is slidably mounted a spring tensioning member 57. This spring tensioning member 57 has a pair of spaced end walls 59—59 each having a non-circular opening 61 which conforms to the shape of the flattened end portion 31' of the shaft 31. A coil spring 13 extends around the flattened end portion of the shaft 31 between the end walls 59—59 of the spring tensioning member. The spring 13 has end portions 13a'–13a which extend on opposite sides of a bridging portion 60 of the spring tensioning member 57 and straddle a rib 63 projecting downwardly from the wall of the housing, as best shown in FIG. 4, which shows the normal position of the spring 13 where it is not under any appreciable tension. When the shaft 31 is rotated in a counterclockwise direction as viewed in FIGS. 4 and 5, the spring tensioning member 57 will place the spring under tension as the bridging portion of the member 57 pushes the end portion 13a' of the spring 13 outwardly. The shaft 31 return to its starting position (shown in FIG. 5) under force of the spring when allowed to do so.

As best indicated in FIG. 6 the legs 11—11 of the inductor core 10a extend into the upper compartment of the housing 2. The core section 10a' which bridges the core legs 11—11 is carried by a flipper member 65. The core section 10a' is held to the flipper member by a pair of screws 67a—67a (FIG. 4) bearing upon the upper surface of the flipper member 65 and shank portions 67b—67b which pass freely through openings in the flipper member and thread into the core section 10a'. Springs 69—69 surround the shank portions of the screws 67—67 and bear at the upper ends thereof on downwardly facing shoulders 71—71 of the flipper member and at the lower ends thereof on the top of the core section 10a'.

The flipper member 65 has a central longitudinal channel 74 which gives the flipper member a generally U-shape as best shown in FIG. 6. The flipper member 65 is rotatably mounted on a pair of axially spaced inwardly extending pivot pins 74—75 extending inwardly from the walls of the compartment 30 of the housing 2. The pins 75 provide a central pivot point for the flipper member which has one extreme position shown in FIG. 4 where the core section 10a', which is located on one side of the flipper pivot axis, bridges the core legs 11—11. The other extreme position of the flipper member shown in FIG. 5 is one where the core section 10a' is raised from the position shown in FIG. 4 where it bridges the core legs.

The flipper member normally is latched in the position where the core section 10a' carried thereby bridges the core legs 11-11 by a latch dog 78 (FIG. 4) pivotally mounted on a pin 80 extending from the inside of the housing 2. The latch dog 78 is urged in a counterclockwise direction by a spring 82, and the end of the latch dog abuts a shoulder 84 formed by a recess in the left end of the flipper member as viewed in FIGS. 4 and 5. The shaft 31 carries a camming collar 83 having a shoulder 83a which engages a wing 86 on the latch dog 78 to move the same clockwise to release the dog from the flipper member which is pivoted in a clockwise direction when the shaft 31 has rotated in a counterclockwise direction to a tripping position to be described more fully hereinafter.

The flipper member 65 is latched into the limit switch actuating position shown in FIG. 5 by a latch dog 78' mounted on a pivot pin 80' extending from the housing 2 and urged by a spring 8a' into a clockwise direction. When the flipper member is in its extreme clockwise position, the end of the latch dog 78' will be pressed by spring 8a' against a shoulder 84' formed by a recess at the right-hand end of the flipper member as viewed in FIG. 5. The latch dog 78' is released from the flipper member when the shaft 31 is rotated clockwise to a position where 83b of the collar depresses a wing 86' on the latch dog 78' which imparts a counterclockwise movement to the latch dog, thereby releasing it from the shoulder 84' of the flipper member 65.

Means in the form of an actuating arm 90 in cooperation with other means to be described impart a rocking force to the flipper member 65 to operate the same to its extreme positions illustrated in FIGS. 4 and 5. The actuating arm 90 cooperates with an upwardly facing circular cam surface 92 having a radius of curvature approximately the same as the radial extent of the actuating arm 90. The cam surface 92 is formed on a cam member 94 positioned within the longitudinal channel 74 of the flipper member 65. The cam member 94 is guided for vertical movement in the channel 74 by the ends of pivot pins 75—75 which pass into guide slots 96—96 in the cam member (FIG. 6). The cam member 94 is urged into an uppermost position within the channel 74 by a pair of springs 98-98' surrounding the shanks 104b–104b' (FIG. 2) of a pair of screws 104'–104 located at opposite ends of the cam member 94. The screws 104–104' have heads 104a–104a' positioned above the cam members and the shanks 104b–104b' thereof pass freely through the coil springs 98–98', and thread into the flipper member 65. The springs 98–98' are sandwiched between the bottom defining walls 105 of the longitudinal channel 74 of the flipper member 65 and downwardly facing shoulders 106–106' defining the upper extents of the recesses formed in the cam member.

It can be seen from FIG. 5 that, as shaft 31 rotates in a counterclockwise direction from the extreme position as shown therein, the end of the actuating arm 90 slides along and presses down against the surface 92 of the cam member 94 and builds up force in the spring 98 prior to going past the center of the flipper pivot axis and then in the spring 98' as the arm 90 goes beyond the center of the pivot axis. The compression of the spring 98' tries to flip the flipper member in a clockwise direction but the left latch dog prevents this action. Since the cam member 94 is supported for vertical movement within the flipper member channel 74, the cam member can be moved vertically within the channel 74 without movement of the flipper member, until the left latch dog 78 is released in the manner described, whereupon the force of the compressed spring 98' will flip the flipper member to its fully clockwise position shown in FIG. 5 where the latch dog 78' engages the flipper member shoulder 84' to latch the flipper member in this position.

When the actuating shaft 13 is allowed to return to its initial position by the movement of the movable element 6 away therefrom, the spring 13 will move the shaft 31 in a clockwise direction to cause the actuating arm 90 to ride along the cam surface 92 to a point to the left of center of the pivot axis of the flipper member which will compress the left spring 98 until the right latch dog 78' is released from the flipper member in the manner described, whereupon the left spring 98 will flip the flipper member back to its fully counterclockwise position shown in FIG. 4 where, as above stated, the core section 10a' of the inductor element 10 will again bridge the core legs 11—11.

LIMIT SWITCH CIRCUITS OF FIGS. 9 AND 9B

FIG. 9 shows an electrical circuit for the limit switch unit illustrated in FIG. 1. As there shown, one end of the coil of relay 20 is connected to the output terminal 16 of the limit switch unit 1 by a conductor 47. The other end of the coil is connected to one terminal of the source of alternating current voltage 22 whose other terminal is connected through another conductor 47' to the other output terminal 16' of the limit switch unit. The solid state breakdown switch device 14 illustrated in FIG. 5 is a bidirectional device such as the General Electric Triac device which acts like a pair of back-to-back connected SCR devices with a common gate lead. (Other similar devices may be substituted for the Triac device.) The switch device 14 has load terminals 14a'–14a' respectively connected to the limit switch unit output terminals 16–16' and a gate or control terminal 14b. The device 14 provides a very large impedance across the load terminals thereof before it is fired and provides a near short-circuit across the load terminals thereof when fired by a control voltage of any polarity above a given threshold level which causes a control current to flow through the control of gate terminal above a given magnitude. The switch device 14 reverts to its high impedance nonconductive state when the load current drops below a given holding current level near zero.

A transient suppression network comprising a capacitor 111 and a resistor 112 is connected in series across the load terminals of the switch device 14. The transient suppression circuit prevents a large inductive kick from the coil of the relay 20 from appearing across the switch device 14 upon the abrupt termination of current through the device.

The switch device 14 is controlled by a voltage divider circuit comprising the winding 10b of the inductor element 10 and another impedance, such as a resistor 12a connected in series with the winding 10b. The remote ends of the winding 10b and the resistor 12a are respectively preferably connected to the output terminals 16-16' of the limit switch unit. Although the juncture of the winding 10b and resistor 12a could be directly connected to the control terminal 14b of the switch device 14 where the switch device 14 is a Triac or similar device, it is most advantageously coupled thereto through a two terminal bidirectional solid state breakdown triggering or control device 17 therebetween, the device 17 acting like a pair of back-to-back connected PNPN diodes. Thus, the control device 17 normally acts like a very high impedance and, when a voltage of any polarity exceeding a given threshold level is applied to the terminals thereof to fire the same, it acts like a very low impedance to the flow of current therethrough. It is of significance that the voltage drop thereacross is very low, like one or two volts or less, so that it absorbs little or no power. The high impedance state of the device 17 resumes when the current drops below a holding current level near zero. FIG. 9A illustrates the E–I characteristic of the device 17. Another desirable characteristic of the low voltage drop across the control device 17 is that a maximum signal is delivered to the switch device 14.

The threshold or breakdown voltage of the control device 17 is selected so that it is greatly in excess of the threshold level of the Triac switch device 14. The control device 17 is of particular value in a circuit utilizing SCR type devices like the Triac device, where the firing conditions can vary somewhat between apparently identical devices. Thus, if the Triac device 14 needs a voltage above a few volts applied to the control terminal 14b to develop sufficient gating current to fire the Triac, the threshold level of the control device 17 is selected many times higher than the volts referred to and, in the example illustrated, as much as fifteen volts or more, so that the firing of the control device 17 will fire any Triac device. Also, the impedances 10b and 12a making up the voltage divider circuit referred to can be of convenient values and so that current drain and power loss therefrom during the inoperative state of the limit switch unit is minimized. Current flow in the control circuit of the switch device 14 is determined primarily by the magnitude of the resistor 12a and the voltage divider circuit voltage developed thereacross. In the absence of the two terminal control device 17, assuming that the output of the voltage source 22 was 110 volts or more and the inductor winding 10b comprises a large number of windings having an appreciable resistive and reactive impedance, the resistance of the resistor 12a would have to be of an exceedingly small value to develop under two volts during the inoperative condition of the limit switch unit. In such case, the power loss ($E^2/R$) in the resistor during the inoperative condition of the limit switch unit could be appreciable, and so it would be desirable to maximize the value of resistor 12a. (The total maximum impedance of the inductor winding 10b could be, for example, several thousand ohms, of which about several hundred ohms could be the value of the resistive component of the winding impedance.) It will be assumed that the reactance of the inductor winding 10b is small when an air gap is provided in the core 10a so that the resistance of the winding 10b then supplies the major impedance of the winding. When a control device 17 is provided having a threshold or breakdown voltage of, for example, 15 or more volts, the resistor 12a can have a relatively large value (e.g. 200 or more ohms) to provide a voltage to fire the control device 17. This produces a voltage in excess of the threshold or firing voltage of the control device 17 across the resistor 12a when the limit switch unit is in its operative condition.

The inductance of the winding 10b in the operative condition of the limit switch unit is sufficient (though relatively small) to aid in sustaining current flow through the control or gate terminal 14b of the switch device 14 for a sufficient period to ensure firing of the switch device 14. The maintenance of the current flow is of particular importance where the switch device controls an inductive load, such as the coil of relay 20. The inductance will tend to maintain current flow once this current is establised due to its tendency to oppose a change in current flow therethrough.

To summarize, when the core section 10a' bridges the core legs 11—11, the impedance of the inductor windings 10b is so great that substantially all of the applied voltage appearing across the limit, switch unit output terminals 16–16' appears across the inductor winding 10b and the voltage across resistor 12a is so insignificant that it is manifestly insufficient to fire the control device 17. The limit switch unit is actuated when the core section 10a' separates from the core legs 11—11 of the core whereupon the inductance of the inductor winding 10b reduces to a very low value leaving only the resistance thereof in the voltage divider circuit where the voltage across the resistor 12a is in excess of the threshold level of the control device 17 to fire both this device and the switch device 14.

Since we are dealing with alternating current waveforms, it is apparent that there could be a delay in the time it takes the voltage across the resistor 12a to reach the value which fires the breakdown device 17, so the conduction of the switch device 14 can be substantially less than 180 degrees. The circuits of FIGS. 9B and 10 to be described provide much larger conduction angles.

In FIG. 9, the presence of an iron core inductor 10 in series with a resistor 12a connected in the control circuit of the switch device 14 can cause marginal operation of the circuit when power is first turned on because iron core inductors always experience an inrush of current when AC power is first switched on. This inrush of current causes a high transient voltage to appear across resistor 12 resulting in an occasional transient firing of the devices 17 and 14. The problem is solved by replacing resistor 12a with an inductor 12c. In such case, even though the current inrush still exists when AC power is switched on, the two inductors divide the voltage on a transient basis in accordance with the same ratio as they do on a steady state basis. Therefore, no transient voltage is present to fire the devices 17 and 14 when AC power is applied suddenly to the limit switch. The circuit of FIG. 9B has the advantage of the circuit of FIG. 9 of minimum power loss and current drain under normal conditions.

LIMIT SWITCH CIRCUIT OF FIG. 10

The circuit of FIG. 10 is similar to that of FIG. 9 except that the positions of the inductor winding 10b and the resistor 12a' in series with it are reversed and the operation of the snap action means 8 is inverted so that the core section 10a' in the normal inoperative condition of the limit switch unit is spaced from the core legs 11—11 instead of bridging the legs, to provide a minimum inductance in the winding 10b and in the operative condition thereof is positioned across the core legs. In this circuit also, the value of the resistor 12a' would probably be increased so that the voltage normally across the inductor winding 10b is less than the threshold device level of the control device 17. The limit switch unit is actuated by the increase in the inductive reactance of the winding 10b as the core section 10a' is brought into contact with the core legs 11—11 which increases the voltage across the winding 10b to a value above the threshold level of the control device 17.

When the switch device 14 fires, the control device 17 will become non-conductive because the voltage across the voltage divider circuit drops below that which will supply holding current to the control device 17. For the remainder of the half cycle involved, a very small current will then flow through the resistor 12a' and winding 10b. Near the end of the half cycle of current flow involved (the current lags the applied voltage for an inductive load the relay coil), when the switch device 14 becomes non-conductive again as the current drops below the holding value, a large applied voltage will be established across the voltage divider circuit which will tend to increase the flow of current through this circuit. But, due to the relatively large inductance of the windings 10b, a very high induced voltage will be developed across the winding 10b which tends to oppose the increase in current therethrough, and this large voltage will effect the firing of the control device 17 very early in the new half cycle involved. Thus, the circuit of FIG. 10 has the advantage that it will have a much larger angle of conduction than the circuit of FIG. 9. However, since the reactive impedance of the inductor element 10 is very low during the inoperative state of the limit switch unit, a relatively large leakage current flows which may cause significant power loss in the resistor 12a' and the windings 10b.

LIMIT SWITCH CIRCUIT OF FIG. 11

Refer to FIG. 11 which shows another modified circuit usable with the limit switch unit of the present invention. In this circuit, the inductor element numeral 10" is a transformer comprising, as shown in FIG. 11A, a primary winding 10b' and a secondary winding 10b" wound on the core 10a. The primary winding 10b' is connected across the output terminals 16–16' of the limit switch unit and the secondary winding 10b" is connected between one of the output terminals 16' and one of the terminals of the control device 17.

In this form of the invention, core section 10a' is spaced from the core legs 11—11 during the inoperative condition of the limit switch and is brought into bridging relation thereto when the limit switch unit is actuated. In the former position of the core section 10a', there is small coefficient of coupling between the primary and the secondary windings 10b' and 10b" so that only a very small voltage is induced in the secondary winding 10b" which cannot fire the control device 17. When the core section 10b' is brought across the core legs 11—11, the coefficient of coupling will increase considerably, so that there will be induced in the secondary winding 10b" a voltage in excess of the threshold level of the control device 17.

LIMIT SWITCH CIRCUIT OF FIG. 12

Refer to FIG. 12 which utilizes a pair of high current capacity (e.g. 1.0 amps or higher) two-terminal breakdown switch elements 14–1 and 14–2 connected in series across the limit switch output terminals 16–16'. (The control device 17 of FIGS. 9–11 is a low current capacity device carrying, for example, only 100 ma.) The switch elements 14–1 and 14–2 may be identical to control device 17 except that they have a much higher current capacity and, in the exemplary circuit to be described, a higher threshold or breakdown voltage level. The switch elements 14–1 and 14–2 together form what is referred to generically in connection with FIG. 1 as a bidirectional solid state breakdown switch device having load terminals 14a and 14a' and a control terminal 14b (which, in FIG. 12, is located at the juncture between the switch elements 14–1 and 14–2). It will be assumed that each switch element 14–1 and 14–2 has a threshold or breakdown voltage level somewhat greater than one half of the peak value of the output of the source of applied voltage 22. Thus, the sum of the threshold voltages of the switch elements 14–1 and 14–2 is greater than the peak value of the output of the voltage source 22.

A voltage divider circuit is provided comprising the winding 10b of the inductor element 10 connected across the switch element 14–1 and a resistor 12a", or other impedance as winding 10b, connected across switch element 14–2. During the inoperative condition of the limit switch unit, the applied voltage divides equally between the winding 10b and the resistor 12a" and the voltage appearing across each of the switch elements 14–1 and 14–2 is below the threshold voltage thereof.

When the limit switch unit is actuated, the impedance of the inductor 10 will either go up substantially or down substantialy, depending upon the particular arrangement of the snap action means 8, to unbalance substantially the voltage divider circuit. The unbalance of the voltage division will be such that the voltage across one of the switch elements 14–1 and 14–2 will be enough to fire the same. When this occurs, the full applied voltage will be applied across the still unfired switch element which will, therefore, fire also. The circuit of FIG. 12 in other respects acts like the circuit of FIG. 9.

LIMIT SWITCH UNIT OF FIG. 13

Refer now to FIG. 13 which shows a basic modification of the limit switch unit previously described. In previous limit switch units, it was assumed that the movable element to be monitored made physical contact with an actuator member which actuated the limit switch unit. In FIG. 13, there is no physical contact between the movable element 6 and the limit switch actuating means which, in this case, is a photocell unit 110. A light source 112 is attached to the movable element 6 and a stationary mask 113 is mounted in front of the photocell unit 110 so that the photocell unit 110 will receive the light from the light source 112 only when the movable element reaches its limiting position 7. In such case, the light striking the photocell unit 110 will render the same highly conductive.

The photocell unit 10 when light from the light source 112 strikes it acts like a low resistance and in the absence of the light striking the photocell unit acts as a relatively high resistance. This variation in the impedance of the photocell unit 110 can be used to control the flow of current through a control winding 116 of a saturable core unit 120 wherein the core of the unit is normally unsaturated and is saturated when light strikes the photocell unit. Thus, the control winding 116 is in series with a source of voltage 118 and the photocell unit 110. The saturable core unit 120 has a gate winding 122 which acts as a high impedance when the core is unsaturated and a low impedance when the core is saturated. The gate winding 122 replaces the inductor winding 10b in the circuit of FIG. 9. Thus, when the limit switch unit of FIG. 13 is in its normal inoperative condition, substantially all of the applied voltage is across the gate winding 122 and little or no voltage appears across the resistor 12a which cannot then fire the control device 17. When, however, the movable element 6 reaches the limiting position 7, the core of the saturable core unit becomes saturated and the impedance of the gate winding 122 reduces to a value where the voltage then appearing across the resistor 12a is sufficient to fire the control device 17 and the switch device 14 in the manner previously described.

LIMIT SWITCH UNIT OF FIG. 14

FIG. 14 illustrates a form of the invention wherein the variable inductor element 110 in FIG. 9 is replaced by a fixed inductor element having a winding 132 and the resistor 12a in FIG. 9 is replaced by photocell unit 110. A light source 112 is mounted to a stationary support and normally directs light into the photocell unit 110. The impedance of the photocell unit is normally so low that the voltage thereacross is insufficient to fire the control device 17. When the movable element 6 reaches the limiting position 7, it will mask or interrupt the light from the source 112 so that the photocell unit 110 will then be in a high impedance state where the voltage drop thereacross is sufficient to effect firing of the control device 17 and the switch device 14.

It is apparent that the various forms of the invention described above provide a very reliable and convenient limit switch unit which represents a substantial improvement over the limit switch units heretofore developed.

It should be understood that numerous modifications may be made in the various forms of the invention described above without deviating from the broader aspects of the invention.

We claim:

1. A contact-free limit switch unit comprising a housing containing a pair of output terminals to be connected to a remote circuit outside of said housing, an inductive device having a core with a winding on the core, said core having separable core sections, one of which is movable between core path closing and core path opening positions, actuator means engageable by a movable element when it reaches a given position and when so engaged moving said movable one of said core sections into one of said positions, said winding of said inductive device forming an inductance which has a high reactive impedance when said one core section is in said core path closing position and a relatively low impedance when said one core section is in said core path opening position, impedance means in series with said winding of said inductive device and which forms therewith a voltage divider circuit, a source of voltage connected across said voltage divider circuit wherein the voltage division across said winding and impedance means varies with said positions of said one core section of the inductive device, a high current capacity solid state breakdown switch in said housing coupled across said output terminals, said solid state breakdown switch having a relatively high impedance circuit opening state and a fired very low impedance circuit closing state where said output terminals are effectively short-circuited, said solid state breakdown switch being fired into said low impedance state when a control voltage fed thereto exceeds a given threshold level, and means coupled across one of said winding and impedance means for coupling the voltage thereupon to said solid state breakdown switch which voltage exceeds said threshold level when said one core section is in one of said positions.

2. The limit switch unit of claim 1 wherein the inductance of said inductive device sustains the switching current when the breakdown switch is initially fired.

3. The limit switch unit of claim 1 wherein: said output terminals thereof are to be connected into an external circuit including a source of voltage in series with a load device to be controlled, said breakdown switch has a control terminal and a pair of load terminals connected across the output terminals of said limit switch unit, the feeding of a control voltage above a given threshold level between said control terminal and one of said load terminals effects the firing of said breakdown switch to said low impedance state, said voltage divider circuit providing between said one load terminal of the switch and a reference point a first voltage which is below said threshold level when said core section is in one of said positions and a second voltage which is above said threshold level when said core section is in the other of said positions, and said coupling means connects said reference point to said control terminal of said breakdown threshold switch at least during the presence of the latter voltage.

4. The limit switch unit of claim 1 wherein said coupling means comprises a two terminal solid state breakdown control device which is normally in a substantially non-conductive state when said first voltage is present between one of said load terminals of said breakdown switch and said reference point and is fired into a substantially fully conductive state where current flows therethrough with practically no voltage drop thereacross when said second voltage is present between one of said load terminals of said breakdown switch and said reference point, the firing voltage of said control device being much greater than that of said switch.

5. The limit switch unit of claim 1 wherein the inductive reactance of said inductive device varies between a relatively high and a relatively low value as the movable element moves between a position short of said given position and said given position.

6. The limit switch unit of claim 20 wherein the inductance device has its high reactance when said movable element is short of said given position normally to minimize current drain in the voltage divider circuit.

7. The limit switch unit of claim 1 wherein said source of voltage is in said external circuit and is connected to the limit switch unit through said pair of output terminals across which the voltage divider circuit is also connected.

8. The limit switch unit of claim 1 wherein said source of voltage is a source of alternating current and said second impedance means is a fixed inductor and the first variable impedance means of the voltage divider circuit is a variable inductance whose inductive reactance thereof varies between a relatively high and a relatively low value as the movable element moves between a position short of said given position and said given position, and said variable inductance has its high reactance when said movable element is short of said given position normally to minimize the current drain in the voltage divider circuit.

9. A contact-free limit switch unit for operating a circuit when a movable element reaches a given position, said limit switch unit comprising a housing containing a pair of output terminals to be connected to an external circuit outside of said housing, a first variable impedance means in said housing responsive to the position of said movable element by providing an electrical impedance having a first impedance value representing a given control value when said movable element reaches said given position and a second impedance value representing a value which is substantially different than said given control value before the movable element has reached said given position, said limit switch unit further includes second impedance means in series with said variable electrical impedance and which forms therewith a voltage divider circuit to be externally energized and wherein voltage division across said variable impedance means and said second impedance means substantially varying when said movable element reaches said given position substantially to vary the impedance of said variable impedance means, a high current capacity solid state breakdown switch in said housing coupled across said output terminals, said solid state breakdown switch having a relatively high impedance circuit opening state and a fired very low impedance circuit closing state where said output terminals are effectively short-circuited, said solid state breakdown switch being fired into said low impedance state when a control voltage fed thereto exceeds a given threshold level, said breakdown switch including two separate two terminal solid state breakdown elements connected in series across said output terminals of the limit switch unit, the source of voltage for said voltage divider circuit being the output terminals of the limit unit, each of said impedance means of said voltage divider circuit being connected across a different one of said two terminal breakdown elements, each of said solid state breakdown elements having a threshold level wherein the voltage across the associated impedance means is less than the threshold level thereof under the voltage division occurring in the voltage divider circuit when said movable element has not reached said given position, and the voltage across only one of said voltage divider impedance means initially being above the threshold level of the associated breakdown element under the voltage division occuring in the voltage divider circuit when said movable element first reaches said given position, the firing of the latter breakdown element raising the voltage across the impedance means associated with the other breakdown element above the threshold level thereof.

10. A solid state switch control circuit having utility in a limit switch circuit, said solid state switch control circuit comprising: a bidirectional breakdown switch device having a control terminal and a pair of load terminals through which current can flow in either direction when the switch device is fired; a load device and a source of alternating current voltage connected in series with said load terminals of said switch device; said breakdown switch includes a pair of two terminal solid state breakdown elements connected in series across the load terminals of the switch device; a voltage divider circuit coupled across the load terminals of the switch device comprising an inductive element and an impedance means respectively connected across said two terminal breakdown elements; means for varying the inductance of said inductive element between a relatively high and a relatively low level to vary the voltage division in the voltage divider circuit; in one condition of said inductive element the voltage division across said inductive element and impedance means being relatively equal, and in the other condition of said inductive element the voltage division across said inductive element and impedance means being substantially unequal; each of said breakdown elements having a firing threshold voltage level above the voltage appearing across the associated impedance means or inductive element when the voltage division in the voltage divider circuit is nearly equal; the voltage across one of the inductor element and impedance means exceeding the threshold voltage level of the associated breakdown element under the unequal voltage division conditions of the voltage divider circuit, where thereby fires the latter breakdown element into a low impedance state to raise the voltage across the other breakdown element above the threshold voltage level thereof.

11. A contact-free limit switch unit for equipment having a movable element whose position is to be monitored, a control element which controls the movement of said movable element, an external circuit including said control element and a source of energizing voltage, the limit switch unit to be connected in said external circuit for opening and closing the same and located along the path of movement of the movable element and operated by said movable element for controlling said control element and, hence monitoring the movement of said movable element, said contact-free limit switch unit comprising: a housing containing a pair of output terminals connected to said external circuit, a contact-less variable inductor means in said housing, said variable inductor means having a core with a winding on the core, said core having separable core sections, inductor varying actuating means including an actuator member to be engaged and moved by said movable element when the movable element reaches a given position and snap-action means operated by said actuator member and having a first position when the movable element has not reached said actuator member and a second position when said actuator member is engaged by said movable element, said snap-action means in moving between said first and second positions respectively moving one of said core sections between core path closing and core path opening positions, a high current capacity solid state switch in said housing coupled across said output terminals, said solid state switch being operable between a relatively high impedance circuit opening state and a very low impedance circuit closing state where said output terminals are effectively short circuited, said solid state switch being triggered into said low impedance state when a control voltage fed thereto exceeds a given threshold level, and control means including means coupled to said winding for feeding a control voltage to said solid state switch which voltage exceeds said threshold level when said one core section is in the position resulting from the movement of said snap-action means into said second position.

12. A contact-free limit switch unit for operating a circuit when a movable element reaches a given position, said limit switch unit comprising a housing containing a pair of output terminals to be connected to an external circuit outside of said housing, a first variable inductor in said housing responsive to the position of said movable element and having an inductance which suddenly varies substantially in value as said movable element reaches said given position, said limit switch unit further includes a fixed inductor in series with said variable inductor and which forms therewith a voltage divider circuit to be externally energized and wherein voltage division across said variable and fixed inductor substantially varies when said movable element reaches said given position where the impedance of said variable inductor substantially decreases, a high current capacity solid state breakdown switch in said housing coupled across said output terminals, said solid state breakdown switch having a relatively high impedance circuit opening state and a fired very low impedance circuit closing state where said output terminals are effectively short-circuited, said solid state breakdown switch being fired into said low impedance state when a control voltage fed thereto exceeds a given threshold level, and means responsive to the change in the voltage divider circuit when the movable element reaches said given position for feeding a control voltage in excess of said threshold level to said breakdown switch.

References Cited

UNITED STATES PATENTS

| 2,334,543 | 11/1943 | Connolly | 336—135 |
| 2,374,883 | 5/1945 | Naul | 336—135 |
| 2,472,389 | 6/1949 | Von Stoeser | 200—61.2 |
| 3,068,332 | 12/1962 | Jeffrey | 200—47 |
| 3,327,194 | 6/1967 | Trapp | 200—47 |
| 3,360,713 | 12/1967 | Howell | 307—252 |
| 3,364,318 | 1/1968 | Bulliet | 200—47 |

OTHER REFERENCES

Product Engineering "Guide to Limit Switches," Nov. 12, 1962, pp. 84–101.

General Electrical Application Note, May 1964, "Triac Control For AC Power" by E. K. Howell, pp. 1-7.

DONALD D. FORRER, Primary Examiner

H. A. DIXON, Assistant Examiner

U.S. Cl. X.R.

200—47